United States Patent [19]
Ahmed

[11] Patent Number: 5,153,760
[45] Date of Patent: Oct. 6, 1992

[54] OSCILLATING PHOTOVOLTAIC OPTICAL SHUTTER FOR REFLECTIVE DISPLAY

[76] Inventor: Adel A. A. Ahmed, 11 Cedar Grove Rd., Annandale, N.J. 08801

[21] Appl. No.: 537,328

[22] Filed: Jun. 13, 1990

[51] Int. Cl.⁵ .................... G02F 1/1335; G02F 1/135
[52] U.S. Cl. ....................................... 359/70; 40/448; 40/465; 359/72
[58] Field of Search ........... 350/338, 342, 351, 331 R; 340/716 US; 40/465, 902, 448; 359/70, 72, 84

[56] References Cited

U.S. PATENT DOCUMENTS

| | | | |
|---|---|---|---|
| 2,901,669 | 8/1959 | Coleman | 315/158 |
| 3,614,210 | 10/1971 | Caplan | 350/331 R X |
| 3,905,682 | 9/1975 | Meyerhofer | 350/33 S |
| 4,071,912 | 2/1978 | Budmiger | 2/8 |
| 4,462,661 | 7/1984 | Witt | 350/331 R |
| 4,475,031 | 10/1984 | Mockovciak, Jr. | 250/212 |
| 4,491,390 | 1/1985 | Tong-Shen | 350/331 R |
| 4,560,239 | 12/1985 | Katz | 350/331 R |
| 4,690,508 | 9/1987 | Jacob | 350/331 |
| 4,721,364 | 1/1988 | Itoh et al. | 350/332 |
| 4,791,418 | 12/1988 | Kawahara et al. | 340/784 |
| 4,893,903 | 1/1990 | Thakar et al. | 350/331 |
| 4,940,313 | 7/1990 | Hamatani | 350/342 |

FOREIGN PATENT DOCUMENTS

| | | |
|---|---|---|
| 3202380 | 8/1983 | Fed. Rep. of Germany . |
| 2228234 | 11/1974 | France . |
| 1457531 | 9/1974 | United Kingdom . |

Primary Examiner—Stanley D. Miller
Assistant Examiner—Ron Trice

[57] ABSTRACT

An optical shutter operated device includes a reflector to reflect incident light and a liquid crystal light shutter interposed in front of the reflector. A photovoltaic cell is disposed behind the shutter and is illuminated by the incident light thereby supplying a control voltage to the liquid crystal light shutter for causing it to alternate cyclically between a relatively transparent state and a relatively opaque state.

25 Claims, 2 Drawing Sheets

OSCILLATING PHOTOVOLTAIC OPTICAL SHUTTER FOR REFLECTIVE DISPLAY

FIELD OF THE INVENTION

The present invention relates generally to optical shutter operated devices as may be used in flashing signs of the type typically found in a vehicular traffic environment and more particularly of the type used as an advisory or advertising sign.

BACKGROUND OF THE INVENTION

Advisory signs are widely used on highways to provide a variety of messages to motorists, such as traffic control information at an intersection, highway condition, a pedestrian cross-walk, the presence of a hazard such as an excavation or a road construction barricade and the like.

For night-time visibility, such advisory signs are typically arranged to reflect light from a highly reflective surface, for example, a reflector surface comprising an array of corner reflectors typically colored or utilized in conjunction with a color filter. The reflecting surface is typically arranged in the shape of symbols and/or words to provide a specific message or may be triangular or simply circular as in the case of reflectors commonly used to draw attention to the edges of a driveway or to the presence of a utility pole close to a roadway.

In order to draw the attention of a motorist more effectively, such signs are sometimes provided with flashing lamps or else flashing lamps are themselves arranged in the form of the message words or symbols. It is recognized that signs incorporating such lamps have substantially higher first cost and require a source of power for operation; furthermore, periodic maintenance is required for lamp replacement. It is also recognized that these requirements generally restrict the deployment of such illuminated signs.

Various arrangements are known for attempting to provide a flashing sign without the above-mentioned drawbacks. Thus, U.S. Pat. No. 4,893,903, "FLASHING ADVISORY SIGN", issued Jan. 16, 1990 (Thakar et al.), and herein incorporated by reference, discloses a flashing advisory sign having an electrically operable shutter positioned between a message sign and a viewing region. The optical shutter is made of a liquid crystal plastic material having a substantially opaque state, in which the message sign is not visible from a viewing region, and a transparent state in which the sign is visible. The state of the optical shutter is controlled by a flashing power supply circuit, the transparent state being achieved when power is applied to the optical shutter and the substantially opaque state being achieved when power is not applied. Another sign arrangement with a liquid crystal type shutter is described in British Patent Specification No. 1,457,531, "IMPROVEMENTS IN OR RELATING TO SIGNS", published Sep. 16, 1974 (Prior et al.)

While the power supply requirement of a liquid crystal shutter and the associated driving circuit arrangement are substantially less than is required for operating lamps, a source of a power supply is nevertheless still required, for example, even where the device is used as an embedded highway lane marker.

Optical shutters of this general type are known in the art, for example, as disclosed in U.S. Pat. No. 4,475,031, "SOLAR POWERED SUN SENSITIVE WINDOW", issued Oct. 2, 1984 (Mockovciak, Jr.), herein incorporated by reference, which describes a self-contained sun sensitive window made up of liquid nematic crystals sandwiched between two transparent conductors and powered directly by a solar cell. The solar cell is located so that sunlight incident upon it is representative of sunlight incident upon the window. An increase of light intensity upon the solar cell reduces the transparency of the window, resulting in a constant intensity behind the window. Mockovciak, Jr. describes two general types of liquid crystal film, one of which is normally opaque and becomes transparent upon the application of an electric field and the other of which types transmits light in the normal state and retards light transmission upon the application of an electric field.

Other applications of such shutters are described in the following, herein incorporated by reference: U.S. Pat. No. 4,791,418, "SIGNAL LIGHT", issued Dec. 13, 1988 (Kawahara et al.); U.S. Pat. No. 4,690,508 Sep. 1, 1987, "LIQUID CRYSTAL CLOSED LOOP CONTROLLED MIRROR SYSTEMS", issued Sep. 1, 1987 (Jacob); U.S. Pat. No. 4,071,912, "LIGHT FILTER FOR WELDER'S MASK", issued Feb. 7, 1978, (Budmiger); U.S. Pat. No. 3,614,210, "LIQUID CRYSTAL DAY/NIGHT MIRROR", issued Oct. 19, 1971 (Caplan). French patent application no. 74.15031, "VARIABLE TRANSPARENCY SCREEN ESPECIALLY FOR MOTOR VEHICLES", opened to public inspection Nov. 29, 1974 (FIAT), discloses a variable transparency screen for motor vehicles to shield against the glare of oncoming headlights. A number of related patents are referenced in the publication "LIQUID CRYSTAL DEVICES (STATE OF THE ART REVIEW, Vol. 7)", published by Optosonic Press, Box 883, Ansonia Post Office, New York, N.Y. 10023; 1973 (Library of Congress Catalog Card No. 73-78006).

SUMMARY OF THE INVENTION

In accordance with a first aspect of the invention, an optical shutter operated device for modulating light from a source of light, comprises a photovoltaic cell means oriented for being illuminated by the source of light. An optical shutter arrangement is coupled to the photovoltaic cell means and interposed between the source of light and the photovoltaic means so as to modulate light reaching the photovoltaic cell and thereby form an oscillatory closed loop including coupling by light modulation.

In accordance with a second aspect of the invention, the optical shutter arrangement comprises a liquid crystal shutter.

In accordance with a further aspect of the invention, reflector apparatus comprises a reflector for incident light and a liquid crystal light shutter interposed in front of the reflector. A photovoltaic cell is disposed for being illuminated by the incident light and for supplying a control voltage to the liquid crystal light shutter for causing it to alternate cyclically between a relatively transparent state and a relatively opaque state.

In accordance with another aspect of the invention, an optical shutter device for modulating light from a source of light, comprises an electrically operable optical shutter arrangement, the shutter arrangement having a first, relatively greater light transmissive operating condition and a second, relatively lesser light transmissive operating condition; and a photovoltaic arrangement coupled to the optical shutter arrangement and being responsive to light for providing an electrical output for causing the shutter arrangement to alternate cyclically between the first and second operating conditions.

In accordance with still another aspect of the invention, an optical shutter device for modulating light from a source of light comprises a light reflective arrangement, the electrically operable optical shutter arrangement being disposed for intercepting light from the source of light travelling towards the light reflective arrangement.

In accordance with yet another aspect of the invention, the photovoltaic arrangement comprises a photovoltaic cell and an oscillatory circuit arrangement coupled to the photovoltaic cell for providing the electrical output.

In accordance with still yet another aspect of the invention, the light reflective arrangement comprises a plurality of corner reflectors.

In accordance with a further aspect of the invention, the reflective arrangement and the photovoltaic arrangement are oriented to receive light from the same source.

In accordance with yet a further aspect of the invention, the electrically operable optical shutter arrangement comprises a liquid crystal light shutter.

In accordance with still a further aspect of the invention, the electrically operable optical shutter arrangement includes a portion thereof interposed between the photovoltaic arrangement and the source of light.

In accordance with still yet a further aspect of the invention, the photovoltaic arrangement comprises a photovoltaic cell connected to the electrically operable optical shutter arrangement.

In accordance with a still yet further aspect of the invention, reflector apparatus for use with an advisory reflective sign comprises: a photovoltaic cell; and an electrically operable light shutter coupled to the photovoltaic cell for alternately blocking and transmitting light between each of the sign and the photovoltaic cell and a viewing region in front of the reflector apparatus.

BRIEF DESCRIPTION OF THE DRAWINGS

In the drawings, which are not to scale, and in which the same reference numerals progressively augmented by 100 are used to designate the same or similar features in the different Figures.

DETAILED DESCRIPTION OF THE PRESENT INVENTION

Figure 1:
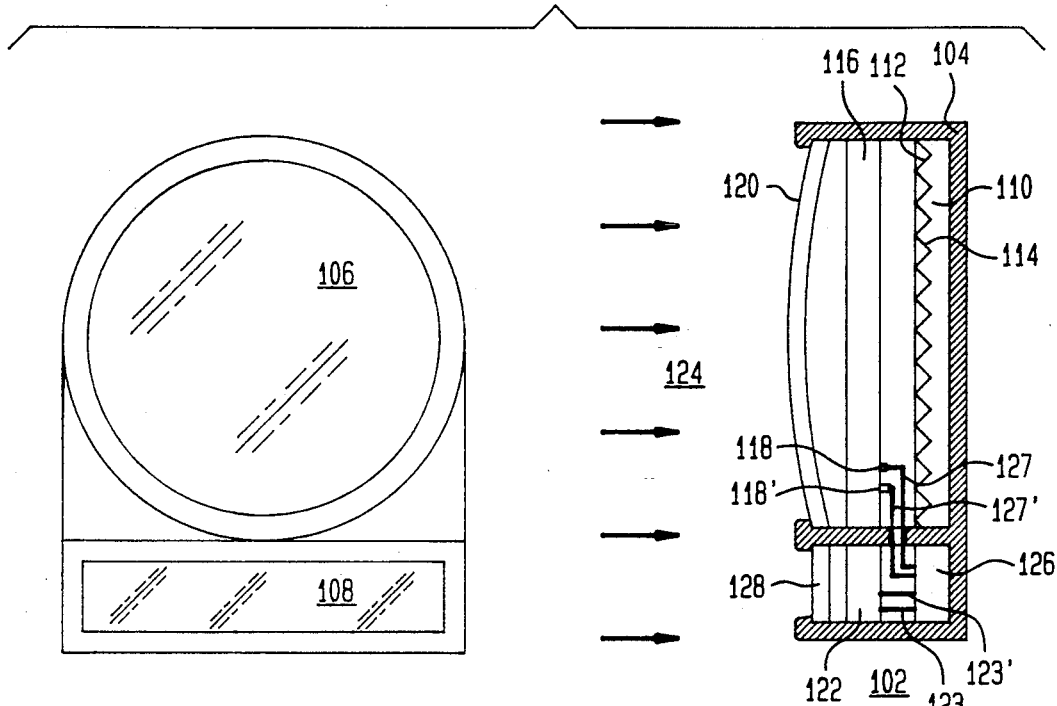
FIGS. 1, 2, 2A, and 3 show various illustrative embodiments in accordance with the invention, in a respective front elevation view, and in a respective side elevation view in section.

FIG. 1 shows an exemplary warning sign 102 in accordance with the present invention, having a generally cup-shaped housing enclosure 104 which may be of metal or plastic, for example. Enclosure 104 has a generally circular reflector compartment portion 106 and an adjacent, generally rectangular compartment portion 108. Compartment portion 106 contains a reflector body 110 which may be of plastic or glass having a reflecting surface 112 which preferably is formed into an array of corner reflectors 114 arranged to reflect incident light back in a direction generally towards its source. Reflectors 114 may be arranged to incorporate a colored filter so that the reflected light is predominantly of a certain color, for example, red or amber for a hazard warning sign.

A light shutter 116, which is preferably a liquid crystal shutter of a type known per se in the prior art, is placed in front of reflecting surface 112 so that the incident light and the light reflected back from reflecting surface 112 pass through it. Light shutter 116 has a pair of control terminals 118, 118' for the application of a control voltage for changing its state from a generally transparent state for light to a generally opaque or diffuse state. Light shutter 116 may be of a known type which is transparent when no control voltage is being applied to control terminals 118, 118' and which becomes opaque or diffuse when an appropriate control voltage is applied. Alternatively, light shutter 116 may be of an opposite known type which is opaque or diffuse when no control voltage is being applied to control terminals 118, 118' and which becomes transparent when an appropriate control voltage is applied. Various types of light shutter materials are available. For example, the afore-mentioned U.S. Pat. No. 4,893,903 refers to a relatively thin liquid crystal material sold under the trademark of OPTO-film by Taliq Corporation of Mountain View, Calif. A transparent protective lens cover 120 is attached to housing enclosure 104 so as to enclose compartment portion 106.

Compartment portion 108 contains a photo-voltaic cell 122 positioned to receive light for its excitation from the incident light, schematically indicated as rays 124. An electronics package 126 is connected to photovoltaic cell 122 by way of leads 123, 123' for receiving electrical power therefrom. Electronics package 126 utilizes extremely low power devices such as CMOS (complementary metal-oxide semiconductor) devices for generating a control voltage in a known manner and is connected by way of leads 127, 127' to control terminals 118, 118' of light shutter 116 for supplying a control voltage thereto. The control voltage is designed to cause light shutter 116 to change condition from transparent to opaque or diffuse in an alternating manner which, in a hazard warning device, may conveniently be at a rate of between 1 and 2 cycles per second or so. A transparent lens or window 128 is attached to housing enclosure 104 so as to enclose compartment portion 108.

In operation, incident light 124 from, for example, the headlight beam of an approaching motor vehicle, illuminates warning sign 102. Photovoltaic cell 122, being illuminated, supplies electrical power to electronics package 126 which applies a control voltage to control terminals 118, 118' of light shutter 116, thereby causing it to alternate between a transparent condition and a non-transparent condition. The appearance of reflecting surface 112, as viewed through light shutter 116, by an observer in the general location of the source of illuminating light, is that of alternating reflection and nonreflection or greatly diminished reflection. When viewed from a "viewing region" in front of the sign, reflecting surface 112 thus appears to "blink" and thereby more effectively draws the attention of, for example, the driver of a motor vehicle. A description of the flashing effect with regard to viewing a retroreflective sign through a liquid crystal shutter and "halo" effects achievable by appropriate spacing is given in the aforementioned U.S. Pat. No. 4,893,903.

Operation of electronics package 126 and, in turn, light shutter 116 by the relatively small amount of electrical power generated by photo-voltaic cell 122 is possible because of the very small power requirements of CMOS circuitry and of liquid crystal shutters. For example, certain hand-held calculators are typically able to operate extensive CMOS computing circuitry and power a liquid crystal display utilizing power from a photovoltaic cell with a small active area operating under illumination intensities much weaker than that provided by the directed headlight beam of a motor vehicle.

Figure 2:
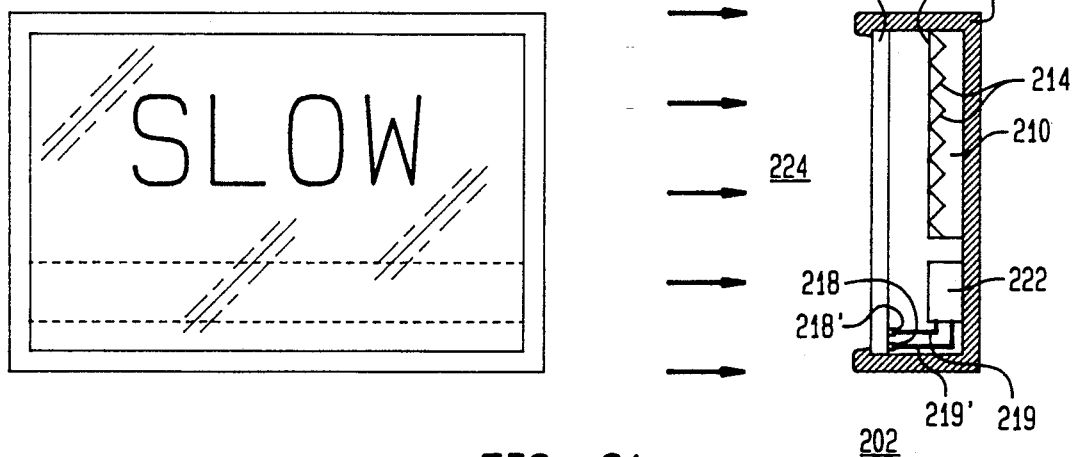

In another illustrative embodiment shown in FIG. 2, a generally rectangular housing 204 has a reflector body 210 attached to a back wall thereof. Reflector body 210 has a reflecting surface 212 which is formed into a plurality of corner reflectors of which two are illustratively designated as 214. A liquid crystal light shutter 216 is attached to housing 204 so that incident light passes through shutter 216 before reaching reflecting surface 212. Light shutter 216 is of the type that is normally transparent when no voltage is being applied to its control terminals 218, 218' and becomes less transparent when an appropriate control voltage is applied. A photovoltaic cell 222 is attached to the back wall of housing 204 so that it can receive incident light which has passed through light shutter 216. Photovoltaic cell 222 is connected to control terminals 218, 218' of light shutter 216 by way of connection leads 219, 219'.

In operation, in the absence of any significant illumination, photovoltaic cell 222 produces no output and light shutter 216 is transparent. When incident light 224 passes through light shutter 216, most of that portion which falls on reflecting surface 212 is reflected back towards the source of illumination and reflector 202 is brightly visible to an observer in the general vicinity of the source of illumination, e.g. to the operator of a motor vehicle. That portion of incident light 224 which impinges on photovoltaic cell 222 causes it to supply an electrical control voltage to light shutter 216, thereby causing it to become less transparent. This reduction in light transmission causes the appearance of reflector 202 to become less visible and at the same time causes the output of photovoltaic cell 222 to drop, thereby causing light shutter 216 to revert to its transparent condition. The appearance of reflector 202 will thus again become brightly visible. The cycle continues to repeat indefinitely so long as sufficient incident light continues to fall on reflector 202 and an observer will thus see the reflector "blinking".

As will be understood, the mode of operation of the embodiment of FIG. 2 represents a case of oscillations produced by feedback in a closed loop system. The oscillatory closed loop involves coupling by light beam and by electrical connection. Light shutter 216 is coupled to photovoltaic cell 222 by means of the modulation of the light passing through it and reaching photovoltaic cell 222. In turn, photovoltaic cell 222 is coupled to light shutter 216 by means of connection leads 219, 219' connected to control terminals 218, 218' of light shutter 216, and so the oscillatory closed loop is formed. Energy for maintaining the oscillations is derived from the incident light by photovoltaic cell 222; the fact that only a very small amount of energy is needed to maintain oscillations derives from the very small energy required to switch liquid crystal light shutter 216 from transparency to opacity. An advantage of the oscillatory, light-coupled closed loop of the present invention is that no separate energy-consuming oscillator is required, resulting in economy of power and parts, thereby making a very compact and reliable design possible.

Figure 2A:
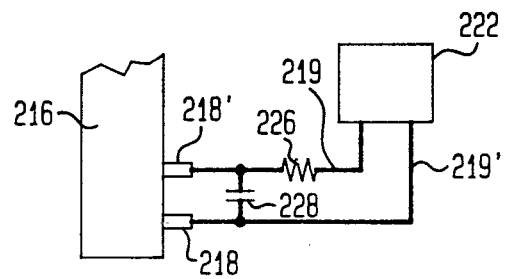

It is herein recognized that a non-oscillatory condition is theoretically possible in a closed loop system when the signal delay or the phase shift around the closed loop is not sufficient to maintain oscillations. In the present embodiment, if the system response had been fast and if the opacity of light shutter 216 is at just the right value to maintain an output from photovoltaic cell 222 that will maintain the opacity at that same value, then oscillations can cease. However, it is well known that such a non-oscillatory condition does not occur in practice when a time delay exists in the oscillatory loop. Liquid crystal shutters generally exhibit a sluggish response in transition between states such that very fast operation is not possible. In practice, therefore, oscillations can be depended upon to occur in the embodiment of FIG. 2. In any event, if it is desired to increase the time constant of the oscillatory loop by introducing time delay so as to achieve a slower rate of oscillation, this is inexpensively accomplished as shown in FIG. 2A by inserting a resistor 226 of suitable resistance value in series with one of the connection leads 219, 219'. Resistor 226 acts in cooperation with the self-capacitance of the liquid crystal shutter 216 to provide an RC time constant to slow down the oscillation rate. In some instances it may be also desirable to connect a small capacitor 228 between terminals 218, 218' so as to add to the self-capacitance of shutter 216 and thereby slow down the oscillation rate even more, if desired.

Figure 3:
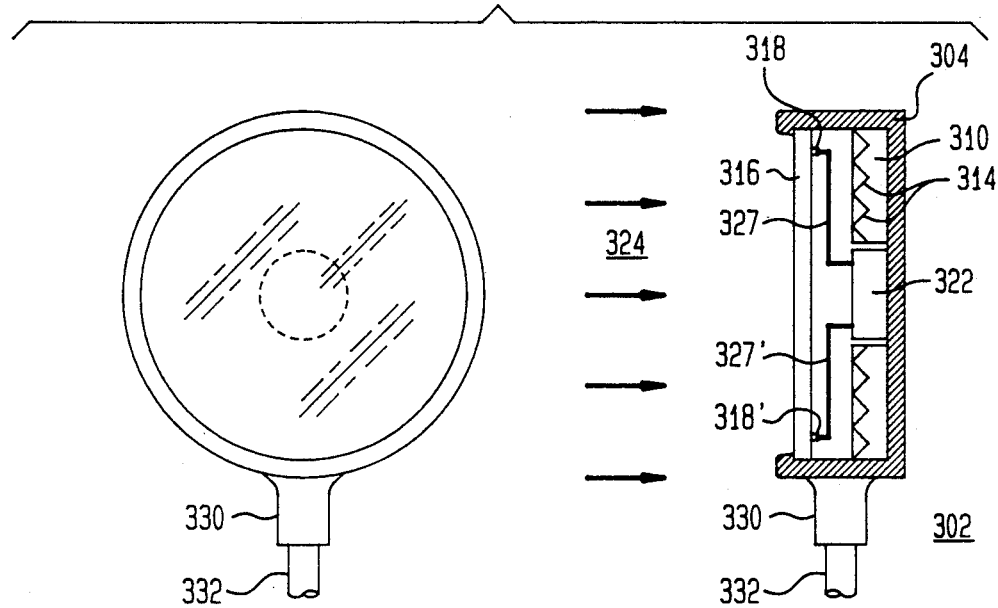

In the embodiment of FIG. 3, a photovoltaic cell 322 is attached in a central hole in a circular reflector body 310 so that a simple circular structure results and which is provided with a mounting socket 330 for receiving a mounting rod or spike 332, suitable for insertion into the ground, for example. The embodiment of FIG. 3 operates on the same oscillatory closed loop principle utilizing light coupling as does the embodiment of FIG. 2 and accordingly results in a compact simple design.

Figure 4:
FIG. 4 shows a further illustrative embodiment in accordance with the invention, in a front elevation view.

FIG. 4 shows an array of reflectors substantially in accordance with the embodiment of FIG. 3 attached to a supporting surface and arranged to form a message in words. The individual reflectors may be left completely independent of one another, in which case they will "blink" at individual rates.

Figure 5:
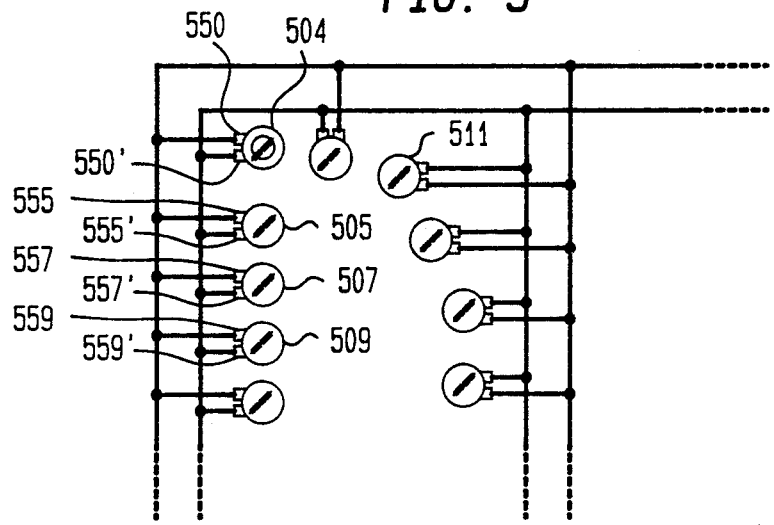
FIG. 5 shows details of another embodiment in accordance with the invention.

FIG. 5 shows a detail of an array similar to that of FIG. 4 except that one reflector 504 has external terminals 550, 550' electrically connected to internal light shutter terminals 518, 518' (not shown), respectively. Each of the other reflectors, 505, 507, 509, and so on, does not contain a photovoltaic cell but instead has the connections to its respective light shutter brought out to a respective pair of external terminals, 550, 550'; 557, 557'; 559, 559' and so on. The pairs of terminals are connected in parallel with each other, and as shown in FIG. 5, they are connected in parallel with terminals 550, 550 of reflector 504.

In operation, reflector 504 serves as a master and the remainder of the reflectors 505, 507, 509, and so on serves as slave reflectors. When reflector 504 "blinks" in the presence of incident light, the periodic control voltage of its photovoltaic cell 522 (not shown) is communicated to the light shutters of the slave reflectors which will consequently "blink" in unison with master reflector 504.

The invention has been described by way of illustratory preferred embodiments. Various changes and modifications will be apparent to one on skill in the art to which it pertains. For example, various different layout arrangements are possible in the shape and relative positions of the housing and other elements without significantly changing the principle of operation. Thus, the photovoltaic cell referred to can comprise a plurality of cells connected in series to produce a higher voltage. Also, different types of light shutter may be utilized. For example, instead of a liquid crystal shutter, it is possible to use a mechanical shutter operated by a D'Arsonval type of meter movement. Although this type tends to be mechanically delicate, it also requires very little operating power. Other kinds of reflectors may also be used rather that the corner reflector array shown in the exemplary embodiments. For example, the afore-mentioned U.S. Pat. No. 4,893,903 discusses "Scotchlite" Brand Reflective Sheeting High Intensity Grade manufactured by the 3M Company, Traffic Control Materials Division, St. Paul, Minn. These and like modifications and substitutions are intended to be within the spirit and scope of the invention which is defined by the claims following.

What is claimed is:

1. An optical shutter operated device for modulating incident light passing through said optical shutter, comprising:

electrically operable optical shutter means, said shutter means having a first, relatively greater light transmissive operating condition and a second, relatively lesser light transmissive operating condition; and photovoltaic means coupled to said optical shutter means, said photovoltaic means receiving light energy from said incident light passing through said optical shutter means for providing a cyclical electrical output for causing said shutter means to alternate between said first and second operating conditions, all electrical power required for operating said optical shutter means being directly supplied by photovoltaic conversion of said light energy.

2. An optical shutter operated device in accordance with claim 1, including light reflective means, said electrically operable optical shutter means being disposed for intercepting light travelling towards said light reflective means.

3. An optical shutter operated device in accordance with claim 2, wherein said photovoltaic means comprises a photovoltaic cell for providing an output voltage when receiving said light energy, an oscillator circuit coupled to said shutter means and said photovoltaic cell and responsive to said output voltage to provide said electrical output to cause said shutter means to alternate between said first and second operating conditions.

4. An optical shutter operated device in accordance with claim 3, wherein said light reflective means comprises a plurality of corner reflectors.

5. An optical shutter operated device in accordance with claim 3, wherein said light reflective means and said photovoltaic cell are oriented to receive light from the same direction.

6. An optical shutter operated device in accordance with claim 5, wherein said electrically operable optical shutter means comprises a liquid light shutter.

7. An optical shutter operated device in accordance with claim 6, wherein said photovoltaic cell is connected to said electrically operable optical shutter means by way of time delay circuit means.

8. An optical shutter operated device in accordance with claim 7, wherein said time delay circuit means comprises an electrical resistance means.

9. An optical shutter operated device in accordance with claim 7, wherein said time delay circuit means comprises an electrical resistance and capacitance means.

10. Reflector apparatus for providing a time varying reflection of light incident thereon, comprising:

reflector means;

electrically operable liquid crystal optical shutter means disposed for intercepting incident light travelling towards said reflector means;

photovoltaic means connected to said electrically operable liquid crystal optical shutter means, said photovoltaic means oriented for receiving said incident light and being the sole source of operative power by photovoltaic conversion of said incident light for said electrically operable liquid crystal optical shutter means; and at least a portion of said electrically operable liquid crystal optical shutter means being disposed for intercepting said incident light travelling towards said photovoltaic means.

11. Reflector apparatus in accordance with claim 10, wherein said electrically operable liquid crystal optical shutter means comprises a liquid crystal shutter having a first operating condition of relatively high light transmissivity and a second operating condition of relatively low light transmissivity, said first operating condition occurring in the absence of significant voltage being applied to said liquid crystal shutter.

12. Reflector apparatus in accordance with claim 11, wherein said light incident thereon causes said photovoltaic means to provide a voltage to said liquid crystal shutter for causing said liquid crystal shutter to operate in said second operating mode.

13. Reflector apparatus in accordance with claim 12, wherein an occurrence of said second operating mode of said liquid crystal shutter causes said photovoltaic means to provide no significant voltage to said liquid crystal shutter, thereby causing it to revert to said first operating mode.

14. Reflector apparatus in accordance with claim 13, wherein said first and second operating modes alternate cyclically.

15. Reflector apparatus in accordance with claim 14, wherein said reflector means comprises a plurality of corner reflectors.

16. Reflector apparatus in accordance with claim 14, wherein said photovoltaic means is connected to said electrically operable liquid crystal optical shutter means by way of an electrical resistance means.

17. Reflector apparatus in accordance with claim 14, wherein said photovoltaic means is connected to said electrically operable liquid crystal optical shutter means by way of an electrical resistance and capacitance means.

18. Reflector apparatus comprising:

reflector means for reflecting incident light;

said incident light originating from a source;

photovoltaic means disposed for being illuminated by said incident light to provide an output power signal derived directly from said incident light only when illuminated by said incident light; and electrically operable liquid crystal light shutter means coupled to said photovoltaic means, a first portion of said light shutter means being disposed between said source and said reflector means and a second portion thereof being disposed between said source and said photovoltaic means, and wherein all operating power for said electrically operable liquid crystal light shutter means is provided by said photovoltaic means to enable said shutter to be in an opaque state during the presence of said output power signal thereby causing said electrically operable liquid crystal light shutter to oscillate between a transparent state and said opaque state.

19. Reflector apparatus in accordance with claim 18, wherein said light shutter means exhibits relatively high transparency to light when said photovoltaic means provides a relatively low output voltage and exhibits a relatively low transparency to light when said photovoltaic means provides a relatively high voltage.

20. Reflector apparatus comprising:

retro-reflector means for receiving incident light;

light shutter means interposed in front of said retro-reflector means; and photovoltaic cell means coupled to said light shutter means and disposed for being illuminated by said incident light passing through said light shutter means to provide a power output operating signal having a power level derived photoelectrically from said incident light, and for supplying said signal to said light shutter means as a sole source of operating power thereby causing said light shutter means to operate alternately between a relatively transparent state and a relatively opaque state.

21. Reflector apparatus for use with a reflective sign, comprising:

photovoltaic means responsive to incident light for providing a control voltage when said incident light impinges thereon, said control voltage having a power level derived solely from said incident light; and electrically operable light shutter means coupled to said photovoltaic means for alternately blocking and transmitting light between said reflective sign and a viewing region in front of said reflector apparatus and between said photovoltaic means and said viewing region, only during the presence of said control voltage whereby said photovoltaic means supplies said control voltage to said electrically operable light shutter means to cause light to be alternately blocked and transmitted solely upon the presence of said incident light.

22. Reflector apparatus in accordance with claim 21 wherein said light shutter means comprises a liquid crystal shutter means.

23. Reflector apparatus in accordance with claim 22 wherein transmission of light through said light shutter is reduced when sad photovoltaic means is exposed to light.

24. An optical shutter operated device for modulating incident light, comprising:

photovoltaic cell means oriented for being illuminated by said incident light to provide a control voltage when illuminated;

optical shutter means coupled to said photovoltaic cell means, said shutter means being operative in a first state to enable incident light to pass therethrough and in a second state to restrict the passage of light so as to modulate light reaching said photovoltaic cell means to cause said control voltage to be alternately provided to thereby form an oscillatory closed loop having a frequency of oscillation according to the modulation of said shutter means, whereby said control voltage has a power level derived by photoelectric conversion of said incident light and is provided only during said first state of said shutter means.

25. An optical shutter operated device as recited in claim 24, wherein said optical shutter means comprises a liquid crystal shutter means.

* * * * *